(12) United States Patent
Bernard

(10) Patent No.: US 6,250,801 B1
(45) Date of Patent: Jun. 26, 2001

(54) PROBED FOR MEASURING PHYSICAL PARAMETERS OF A FLUID FLOW

(75) Inventor: Marc Bernard, Saint-Florent-sur-Cher (FR)

(73) Assignee: Auxitrol S.A. (FR)

( * ) Notice: Subject to any disclaimer, the term of this patent is extended or adjusted under 35 U.S.C. 154(b) by 0 days.

(21) Appl. No.: 09/555,178

(22) PCT Filed: Nov. 18, 1999

(86) PCT No.: PCT/FR99/02829

§ 371 Date: May 24, 2000

§ 102(e) Date: May 24, 2000

(87) PCT Pub. No.: WO00/31508

PCT Pub. Date: Jun. 2, 2000

(30) Foreign Application Priority Data

Nov. 19, 1998 (FR) .................................................. 98 14552

(51) Int. Cl.[7] .................................................. G01K 13/02
(52) U.S. Cl. .................................................. 374/138
(58) Field of Search .................................. 374/135, 136, 374/147, 148, 208, 138

(56) References Cited

U.S. PATENT DOCUMENTS

| | | | |
|---|---|---|---|
| 2,579,271 | * | 12/1951 | Polye .................................... 374/135 |
| 2,588,840 | * | 3/1952 | Howland . |
| 2,970,475 | | 2/1961 | Werner .................................. 374/135 |
| 3,016,745 | * | 1/1962 | Simon .................................. 374/135 |
| 4,152,938 | * | 5/1979 | Danninger ............................... 73/349 |
| 4,595,298 | * | 6/1986 | Frederick ............................. 374/145 |
| 4,765,751 | * | 8/1988 | Pannone et al. ....................... 374/135 |
| 4,821,566 | * | 4/1989 | Johnston et al. ................... 73/178 R |
| 5,035,514 | * | 7/1991 | Newman ................................ 374/135 |
| 5,356,219 | * | 10/1994 | Tammera et al. ...................... 374/135 |
| 5,544,526 | * | 8/1996 | Baltins et al. .......................... 73/180 |
| 5,628,565 | * | 5/1997 | Hagen et al. .......................... 374/143 |
| 5,653,538 | | 8/1997 | Phillips .................................. 374/138 |
| 6,076,963 | * | 6/2000 | Menzies et al. ....................... 374/135 |

FOREIGN PATENT DOCUMENTS 0835804  8/1997 (EP) .

* cited by examiner

*Primary Examiner*—G. Bradley Bennett
*Assistant Examiner*—Gail Verbitsky
(74) *Attorney, Agent, or Firm*—Blakely Sokoloff Taylor & Zafman

(57) ABSTRACT

The invention concerns a probe (S) for measuring physical parameters of a fluid flow generally directed rearwards of the probe, the probe comprising a structure (10, 20) bearing at least a sensor (C). The invention is characterised in that said structure comprises a part (20) whereof a leading edge (22) extends generally frontwards of the sensor and has a shape adapted to generate a vortex, and the sensor extends in the axial region of said vortex.

18 Claims, 3 Drawing Sheets

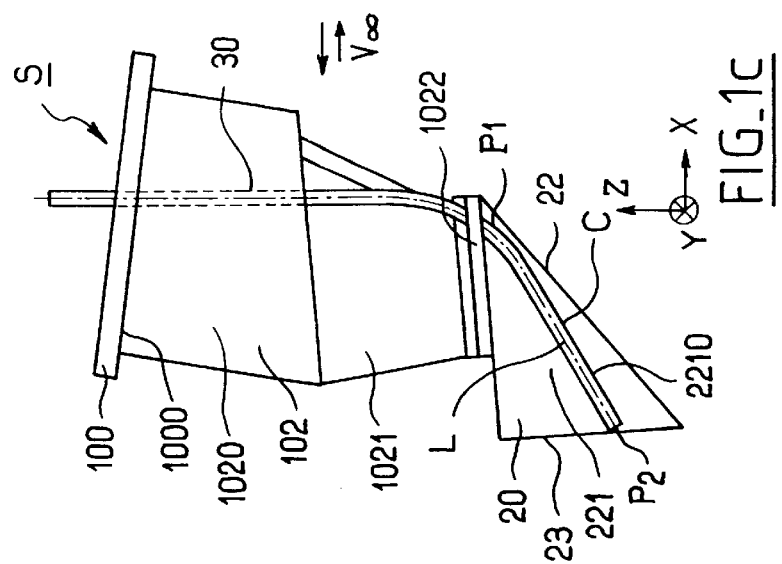
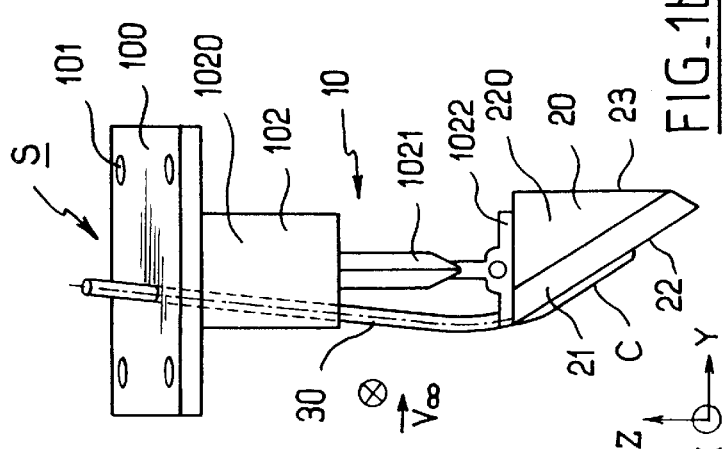
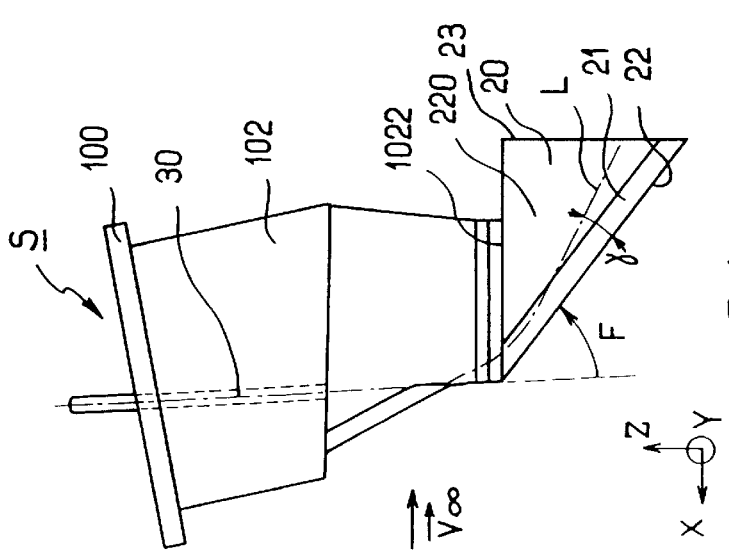
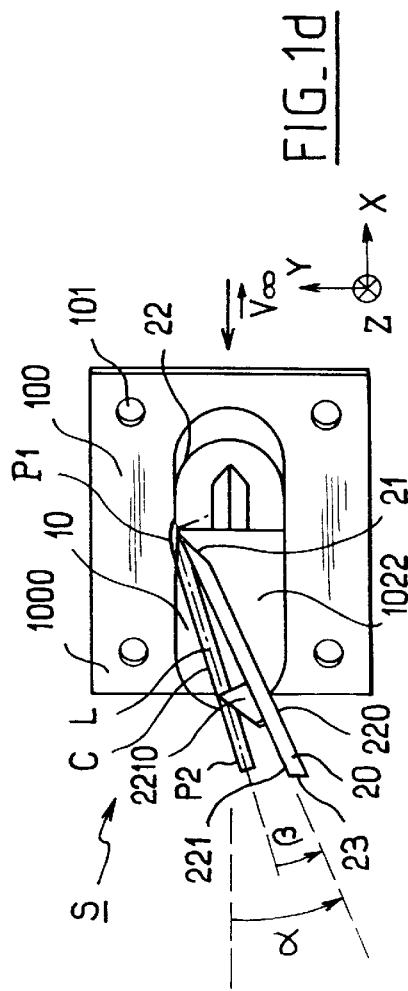
FIG_1a
FIG_1b
FIG_1c
FIG_1d

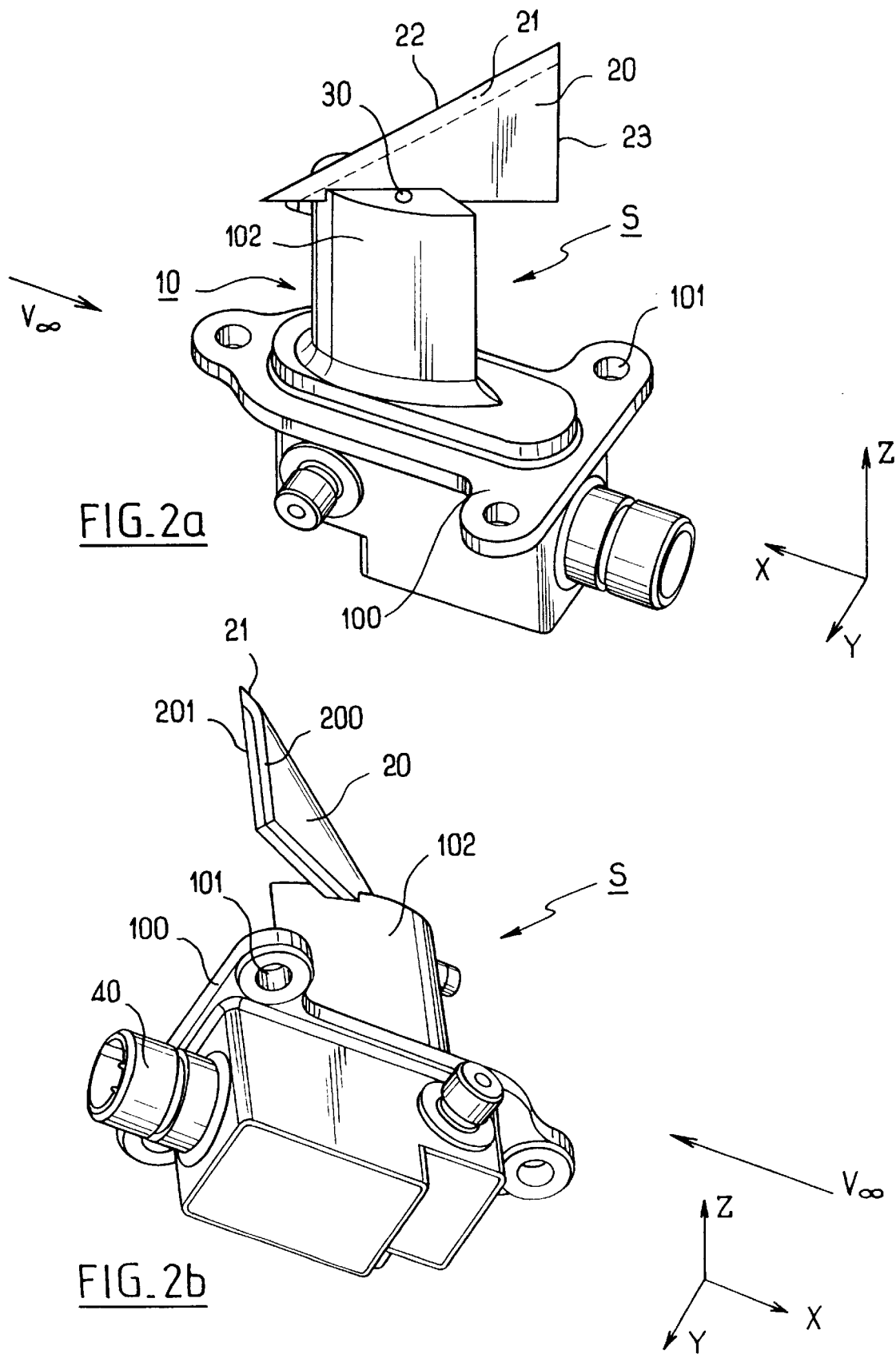

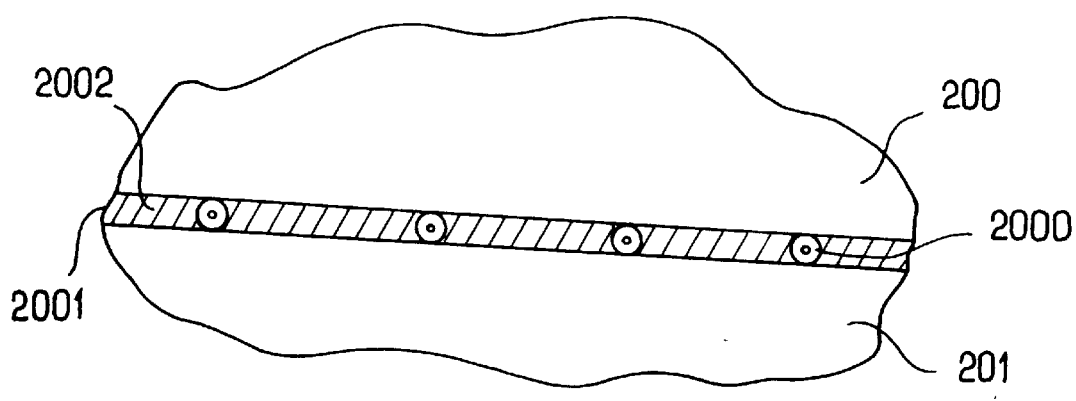
FIG_3
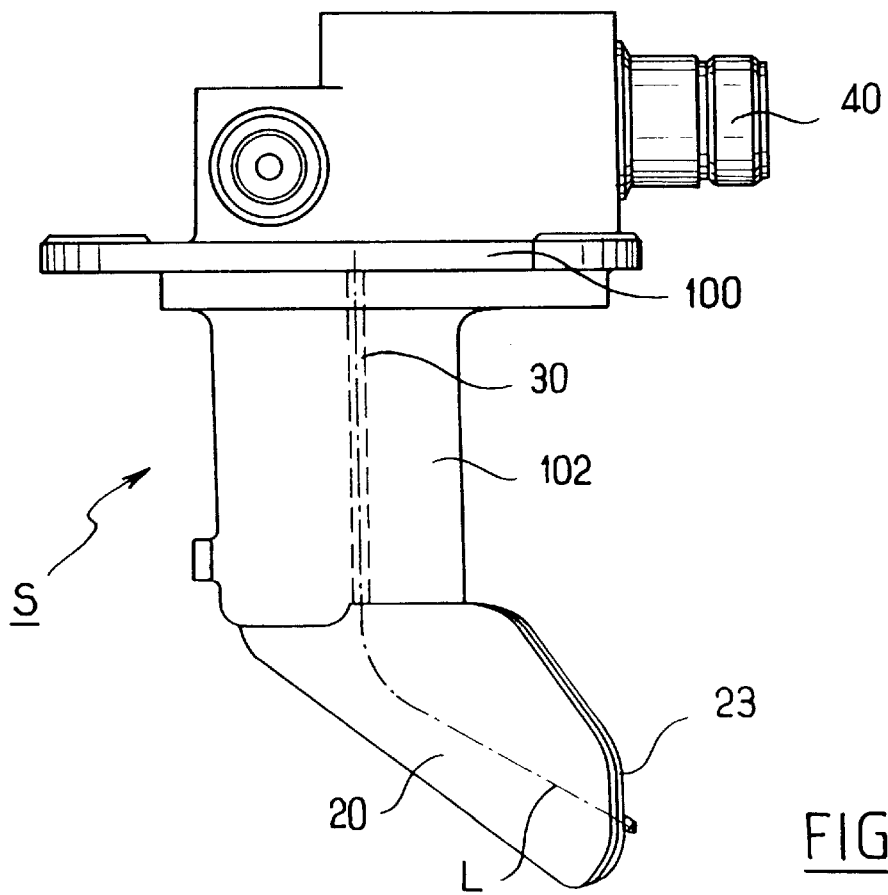
FIG_4

PROBED FOR MEASURING PHYSICAL PARAMETERS OF A FLUID FLOW

FIELD OF INVENTION

The present invention relates to a probe for measuring physical parameters of a flow of fluid.

The invention has a particularly advantageous application in the field of aeronautics, for measuring the temperature of air flowing around an aircraft fuselage or entering the compressor stage of an aircraft jet engine.

BACKGROUND OF THE RELATED ART

Probes mounted on the wall of the fuselage or the engine air intake of an aircraft to measure air temperature are known in the art. Such probes are designed to operate in environments and at altitudes where the temperatures are much lower than 0° C. and in atmospheres that may be charged with supercooled water molecules.

A constraint inherent to the operation of such probes is that they must include means to prevent the formation and accumulation of ice in the proximity of the sensitive element of the probe. Indeed, such an ice accumulation would falsify the measurements effected by the probe.

A prior art solution to the problem of preventing the accumulation of ice consists in heating parts of the probe in the proximity of the sensitive element and in correcting the systematic measurement error due to such heating Such a solution is generally acceptable for measuring the temperature in environments containing relatively little supercooled water (for example less than 1.25 g of supercooled water per $m^3$ of air), but is not suitable in itself for de-icing the probe correctly in atmospheres with a higher moisture content.

This is because, in this case, the only way to guarantee that the ice will melt is more intensive heating, but melting the ice causes a flow of water droplets which come into contact with the sensitive element as they flow over it and thereby falsify the measurements effected by the probe.

Also, more intense heating is not an economically viable solution because of the non-negligible increased electrical power consumption and the associated cost.

Another way to de-ice the probe, used in conjunction with heating, is to define the geometry of the probe to maximize deflection of the trajectories of supercooled water particles contained in the flow of air around the probe so that a high proportion of the particles are kept away from the sensitive element of the probe.

Thus probes exist in which the sensitive element is accommodated in an internal passage which only some of the water particles enter when the air flows around the probe. However, that solution has the drawback of complicating manufacture of the probe, as it is then necessary to provide complex arrangements for connecting electrical cables to supply power to the sensitive element and collect the signals it delivers.

Moreover, in that case, the sensitive element S in a passage into which only part of the air flow enters, and is therefore ventilated only slightly by the airflow, which means that it must be of high sensitivity, which generally increases its cost and makes it more fragile (through the use of ceramic temperature-measuring components, for example).

Another prior art probe has an airfoil profile with the sensitive element in a duct passing obliquely through the thickness of the profile. The sensitive element in that probe is located in a flow that is secondary to the main flow of air around the probe, said secondary flow conveying significantly fewer water particles than the main flow. With only moderate heating of the probe, it is possible to measure reliably the temperature of environments with a relatively high moisture content and at relatively low temperatures.

SUMMARY

An object of the invention is to effect a significant further improvement over the prior art referred to above to enable probes to be made that are able to operate over wider ranges of temperature and moisture content, and where the manufacture and operating costs of the probe are reduced and its reliability is increased To achieve the above object, the invention proposes a probe comprising a structure carrying at least one sensor for measuring physical parameters of a flow of fluid directed generally towards the rear of the probe, which probe is characterized in that said structure has a part with a leading edge which is generally in front of the sensor and is of a shape adapted to create a vortex, and in that the sensor is in the axial region of said vortex.

Preferred, but non-limiting, features of the probe according to the invention are as follows:
- said structural part shelters said vortex from the flow of the fluid;
- said sensor is a temperature sensor comprising a thermocouple or a positive temperature coefficient resistor, in particular of platinum;
- said structural part is adapted to be mounted with a non-zero angle of incidence to the main direction of flow of the fluid to define a lower surface and an upper surface of said structural part;
- said non-zero angle of incidence is in the range 15° to 45° and is preferably approximately 30°;
- said structural part has the general shape of half a delta wing;
- said half delta wing has a sweep angle in the range 35° to 65° and preferably approximately 50°;
- said structural part is essentially plane;
- said structural part has a tapered region between its lower surface and its leading edge so that said leading edge is sharp;
- said sensor extends in an essentially straight line in the vicinity of the upper surface of said structural part and defines a first angular offset to the upper surface, the projection of the sensor onto the mean plane of the upper surface defining in that plane a second angular offset to the leading edge of the structural part;
- each of said angular offsets has a value in the range 5° to 20°;
- said structural part incorporates heater means;
- said structural part incorporates two plates respectively corresponding to the lower surface and the upper surface and with resistive wires between them constituting said heater means and the gap between the two plates is filled with brazing alloy;
- the thermal conductivity of the plate corresponding to the lower surface of said structural part is higher than that of the plate corresponding to its upper surface; and
- said structural part is mounted on a streamlined pylon.

BRIEF DESCRIPTION OF THE DRAWINGS

Other aspects, objects, and advantages of the invention will become more clearly apparent on reading the following description of two embodiments of the invention, which description is given with reference to the accompanying drawings, in which:

FIGS. 1a to 1d are diagrammatic views of a temperature probe of the invention;

FIGS. 2a and 2b are two perspective views of a first embodiment of a probe of the invention;

FIG. 3 is a detailed view of the cross-section of a portion of the probe shown in FIGS. 2a and 2b; and FIG. 4 is a side view of a second embodiment of the invention.

DETAILED DESCRIPTION

FIGS. 1a to 1d are cross-sections of a probe S placed in a flow of fluid at a velocity $V_{\infty}$. To make the description easier to understand, a system of axes XYZ fixed relative to the probe is defined in the manner shown in the figures. In that system of axes:

the fluid impinges on the probe in an upstream to downstream direction parallel to the X axis, and the Z axis is perpendicular to an aircraft wall section (not shown) on which the probe is mounted.

The probe S includes a support 10 to which is fixed a wing (structural part) 20 having the general shape of half a delta wing. FIG. 1d shows the wing 20 placed in the flow of fluid with an angle of incidence α.

The support 10 consists essentially of a plate 100 and a pylon 102 fixed to the plate and carrying the wing.

The plate 100 incorporates holes 101 for fixing it flush with a mounting wall of the fuselage or jet engine air intake of an aircraft.

The pylon 102 is fixed (for example welded) to the face 1000 of the plate, whose outside surface when mounted is flush with the wall of the aircraft. The pylon holds the wing 20 out of the boundary layer flowing over the aircraft and has a streamlined profile in the direction of the X axis to reduce its drag.

In the diagrams shown in FIGS. 1a to 1d, the pylon 102 generally extends along the Z axis and has a first part 1020 adjacent the mounting plate 100 extended by a second part 1021, which is also streamlined but has a different cross-section in the XY plane, and by a plate 1022 to which the wing is fixed.

The pylon 102 can instead be made in one piece with a substantially constant cross-section along the Z axis, as in the two embodiments shown in FIGS. 2a, 2b and 3.

The end of the pylon 102 opposite the support plate 100 carries the wing 20, which forms a rigid assembly with the support 10.

As already mentioned, the general shape of the wing 20 is that of half a delta wing, with a sweep angle F of the order of 50° (see FIG. 1a). FIG. 1a also shows the leading edge 22 and the trailing edge 23 of the wing.

As shown in FIG. 1d (and as can also be seen in FIG. 2b in particular), the thickness of the wing 20 is substantially constant in the plane XY perpendicular to its spread, with the exception of an area 21 adjacent the leading edge 22 and defining a sharp taper between the lower surface 220 of the wing placed in incidence and the leading edge 22. The upper surface 221 of the wing is entirely plane from the leading edge 22 of the wing to its trailing edge 23.

The sharp leading edge 22 of the wing 20 causes the flow of air to separate, with a vortex being formed on the upper surface side of the wing behind the leading edge.

The vortex moves near the upper surface side 221 of the wing with its axis substantially following a straight line L starting from a point P1 at the upstream end near the upper surface side apex of the wing 20.

In the downstream direction, this line L:

diverges from the wing in the XY plane at an angle β (shown in FIG. 1d and whose value is in the range 5° to 20° and preferably around 7.25°), and diverges from the leading edge at an angle y (shown in FIG. 1a and whose value is also in the range 5° to 20°, preferably around 11.04°), to approach the main flow direction X and to overly the wing in the XZ plane.

The formation of the vortex is encouraged by the particular shape of the wing 20 described above, which is half a delta wing. This shape also ensures that the position of the vortex (and in particular of its axis) remains substantially constant over a wide range of Reynolds numbers Re and of angles of incidence α.

However, in an embodiment that is not shown in the figures, the wing 20 can be replaced by a member having a different profile whose sharp leading edge is adapted to generate a vortex also moving in the downstream direction of the flow over the upper surface of said profile when the latter is placed in incidence.

The probe S also includes a temperature sensor C which can incorporate a thermo-resistive component, for example, such as a positive temperature coefficient thermistor (preferably of platinum), but which, in a different embodiment, could equally well be a thermocouple. This sensor constitutes the sensitive element of the probe. To make the figures clear it is shown only in FIGS. 1a to 1d.

The sensor C, which has the shape of an elongate cylinder, is fixed to the upper surface 221, by a support member that is not shown or by welding it directly to the upper surface, in the vicinity of the origin P1 of the vortex, and by a support member 2210 fixed to the upper surface near the trailing edge 23 of the wing.

The sensor is disposed along the line L in order to coincide with the axis of the vortex.

In this embodiment its sensitive element is a positive temperature coefficient thermo resistive wire, connected to an electrical power supply and a signal processor means in the aircraft by cables contained in a duct 30. FIGS. 2a, 2b and 3 also show an electrical connector 40 for connecting these cables to the means of the aircraft.

The duct 30 passes through all or part of the pylon 102 in order not to increase the overall aerodynamic drag. In FIGS. 1a to 1d, the duct 30 passes through only the part 1020 of the pylon. In FIG. 2a the duct is entirely within the pylon 102, which improves the overall aerodynamics.

Referring again to FIGS. 1a to 1d, the sensor C extends along the axis L of the vortex generated by the sharp leading edge 22 of the wing 20, from the leading edge to a point P2 on the axis of the vortex slightly upstream of the trailing edge 23 of the wing.

When the probe is mounted on the wall of the aircraft and the aircraft is moving through the air so that the angle of incidence of the wing 20 to the flow of air is close to α, or when the compressor of the engine is operating and therefore generating a flow of air in the case of a probe mounted in the air intake of a jet engine, the air flowing over the wing 20 swirls into the upper surface vortex referred to above, at the center of which the moisture content is very much lower than the moisture content of the surrounding air.

This is because the leading edge separation referred to above, which is upstream of the vortex, constitutes a first barrier to supercooled water droplets in the air, a significant proportion of which pass over the lower surface of the wing 20.

Moreover, the high swirl of the vortex has a centrifugal effect, which causes most of the drops which passed over the upper surface despite the separation, to move away from the axis of the vortex. Those drops therefore move away from the sensor C, so ice is unlikely to form thereon.

Accordingly, the sensor C of the invention is located at the center of the vortex, which is particularly advantageous in terms of minimizing the disruption of temperature measurements that can be caused by supercooled water in the air.

Moreover, the axial velocities parallel to the axis L of the vortex in the vicinity of the sensor are very high (of the order of 2.5 $V_{oo}$) which encourages ventilation of the sensor.

Good ventilation of the sensor reduces its response time and enables the use of a reinforced sensor which is more rugged than highly sensitive sensors, such as those including ceramic components, which are more costly and more fragile.

Furthermore, being well ventilated, the sensor C delivers measurements which are much more reproducible than those of prior art probe sensors installed in internal passages, which require time-consuming and costly calibration.

Referring to FIG. 2 in particular, the substantially constant-thickness shape of the wing 20 enables a simple implementation in the form of two joined plates 200 and 201, the plate 200 corresponding to the lower surface of the wing and the plate 201 corresponding to its upper surface.

The probe S is also provided with resistive electrical wires to heat the wing and the pylon to prevent ice accumulating on them.

Apart from the fact that making the wing in the form of two plates is simple and economical, it facilitates the integration of the resistive wires for heating the wing between the two plates, said resistive wires being supplied with power via the cables in-the duct 30.

FIG. 3 shows the arrangement of sheathed wires 2000 in the gap 2001 between the plates 200 and 201 of the wing 20.

Because the resistive wires are thin, it is not even necessary to machine the faces of the two plates constituting the wing to incorporate the wires, a brazing alloy 2002 filling the gap.

As already mentioned, a high proportion of the supercooled water contained in the air impinging on the sensor flows over the lower surface of the wing 20. In one advantageous embodiment of the invention, the plate 200 constituting the lower surface of the wing can conduct heat better than the upper surface plate 201, in order to direct heat dissipated by the resistive wires towards the lower surface. In particular, the plate 201 can be made of steel and the plate 200 of copper alloy, for example copper-beryllium alloy.

The probe shown in FIG. 4 constitutes an embodiment of the invention in which the part of the trailing edge 23 of the wing 20 at the greatest distance from the line L corresponding to the axis of the vortex is cut away. This reduces the quantity of material needed to make the wing without compromising its aerodynamic behavior and in particular the formation of the vortex. This also eliminates an eccentric part of the wing which might otherwise generate vibration.

What is claimed is:

1. A probe comprising a structure carrying at least one sensor for measuring physical parameters of a flow of fluid directed generally towards a rear of the probe, wherein said structure has a structural part with a leading edge which is generally in front of the sensor and is of a shape adapted to create a vortex and the sensor is in an axial region of said vortex.

2. A probe according to claim 1, wherein said structural part shelters said vortex from the flow of the fluid.

3. A probe according to claim 1, wherein said sensor is a thermocouple or a temperature sensor comprising a positive temperature coefficient resistor.

4. A probe according to claim 1, wherein said structural part is adapted to be mounted with a non-zero angle of incidence ($\alpha$) to the main direction of flow (X) of the fluid to define a lower surface and an upper surface of said structural part.

5. A probe according to claim 4, wherein said non-zero angle of incidence ($\alpha$) is in the range 15° to 45°.

6. A probe according to claim 1, wherein said structural part has the general shape of half a delta wing.

7. A probe according to claim 6, wherein said half delta wing has a sweep angle (F) in the range 35° to 65°.

8. A probe according to claim 6, wherein said structural part is essentially planar.

9. A probe according to claim 6, wherein said structural part has a tapered region between a lower surface and the leading edge of said structural part so that said leading edge is sharp.

10. A probe according to claim 4, wherein said sensor extends in an essentially straight line in the vicinity of the upper surface of said structural part and defines a first angular offset $\beta$ to the upper surface, the projection of the sensor onto a plane angularly offset with respect to the upper surface defining in that plane a second angular offset ($\gamma$) to the leading edge of the structural part.

11. A probe according to claim 10, wherein each of said angular offsets ($\beta$, $\gamma$) has a value in the range 5° to 20°.

12. A probe according to claim 8, wherein said structural part incorporates heater means.

13. A probe according to claim 12, wherein said structural part incorporates two plates respectively corresponding to the lower surface and the upper surface and with resistive wires between the two plates constituting said heater means and in that the gap between the two plates is filled with brazing alloy.

14. A probe according to claim 13, wherein the thermal conductivity of the plate corresponding to the lower surface of said structural part is higher than that of the plate corresponding to the upper surface of said structural part.

15. A probe according to claim 1, wherein said structural part is mounted on a streamlined pylon.

16. A probe according to claim 3, wherein said sensor is a thermocouple or a temperature sensor comprising a positive temperature coefficient platinum resistor.

17. A probe according to claim 5, wherein said non-zero angle of incidence ($\alpha$) is approximately 30°.

18. A probe according to claim 7, wherein said sweep angle (F) of said half delta wing is approximately 50°.

* * * * *